US012713023B2

(12) United States Patent
Tan et al.

(10) Patent No.: US 12,713,023 B2
(45) Date of Patent: Aug. 18, 2026

(54) IMAGE ENCODING/DECODING METHOD AND APPARATUS BASED ON SCAN ORDER INFORMATION, AND RECORDING MEDIUM STORING BITSTREAM

(71) Applicant: LG ELECTRONICS INC., Seoul (KR)

(72) Inventors: Hendry Tan, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/875,583

(22) PCT Filed: Jun. 15, 2023

(86) PCT No.: PCT/KR2023/008254

§ 371 (c)(1),
(2) Date: Dec. 16, 2024

(87) PCT Pub. No.: WO2023/244022

PCT Pub. Date: Dec. 21, 2023

(65) Prior Publication Data

US 2025/0386023 A1 Dec. 18, 2025

Related U.S. Application Data

(60) Provisional application No. 63/352,646, filed on Jun. 16, 2022.

(51) Int. Cl.
*H04N 19/00* (2014.01)
*H04N 19/129* (2014.01)
(Continued)

(52) U.S. Cl.
CPC ......... *H04N 19/129* (2014.11); *H04N 19/172* (2014.11); *H04N 19/70* (2014.11); *H04N 19/167* (2014.11)

(58) Field of Classification Search
CPC .... H04N 19/129; H04N 19/172; H04N 19/70; H04N 19/167
See application file for complete search history.

(56) References Cited

U.S. PATENT DOCUMENTS 6,751,363 B1 * 6/2004 Natsev ................ G06V 10/431 382/209
9,973,781 B2 * 5/2018 Schierl .................... H04L 47/10
(Continued)

FOREIGN PATENT DOCUMENTS

KR 10-2021-0110710 A 9/2021

OTHER PUBLICATIONS

Mitra Damghanian et al., "AHG12: Raster scan order flag for subpictures", Joint Video Experts Team (JVET) of ITU-T SG 16 WP 3 and ISO/IEC JTC 1/SC 29/WG 11, Document: JVET-R0257, (version 1), 18th Meeting: by teleconference. pp. 1-6, Apr. 15-24, 2020, [Retrieved on Aug. 17, 2023], Retrieved from https://jvet-experts.org/, see pp. 1 and 3.
(Continued)

*Primary Examiner* — Frank F Huang
(74) *Attorney, Agent, or Firm* — Bryan Cave Leighton Paisner LLP

(57) ABSTRACT

An image encoding/decoding method and apparatus are provided. The image decoding method according to the present disclosure may comprise acquiring a first flag related to subpictures from a bitstream and determining a scan order of the subpictures based on the first flag indicating presence of information on the subpictures.

11 Claims, 17 Drawing Sheets

(51) Int. Cl.

| | |
|---|---|
| ***H04N 19/172*** | (2014.01) |
| ***H04N 19/70*** | (2014.01) |
| *H04N 19/167* | (2014.01) |

(56) References Cited

U.S. PATENT DOCUMENTS

| | | | | |
|---|---|---|---|---|
| 10,484,716 | B2 * | 11/2019 | Schierl | H04N 21/234327 |
| 11,122,290 | B2 * | 9/2021 | Jang | H04N 19/66 |
| 2009/0116685 | A1 * | 5/2009 | Yoo | G06T 1/0028 382/100 |
| 2015/0208095 | A1 * | 7/2015 | Schierl | H04N 19/174 375/240.28 |
| 2017/0140079 | A1 * | 5/2017 | Gentilhomme | G01V 1/282 |
| 2017/0340212 | A1 * | 11/2017 | Lin | G16H 30/40 |
| 2018/0220161 | A1 * | 8/2018 | Schierl | H04N 19/423 |
| 2018/0332289 | A1 * | 11/2018 | Huang | H04N 19/96 |
| 2019/0253736 | A1 * | 8/2019 | Schierl | H04N 19/91 |
| 2019/0349587 | A1 * | 11/2019 | Jang | H04N 19/463 |
| 2019/0370965 | A1 * | 12/2019 | Lay | G06N 20/00 |
| 2019/0387241 | A1 * | 12/2019 | Kim | H04N 19/625 |
| 2020/0013420 | A1 * | 1/2020 | Wallace | G10L 19/0216 |
| 2020/0068195 | A1 * | 2/2020 | Yoo | H04N 19/117 |
| 2020/0112749 | A1 * | 4/2020 | Schierl | H04N 19/423 |
| 2020/0177901 | A1 * | 6/2020 | Choi | H04N 19/176 |
| 2020/0177921 | A1 * | 6/2020 | Koo | H04N 19/61 |
| 2020/0296377 | A1 | 9/2020 | Zhou | |
| 2020/0374531 | A1 * | 11/2020 | Zhao | H04N 19/119 |
| 2021/0014534 | A1 * | 1/2021 | Koo | H04N 19/18 |
| 2021/0144376 | A1 * | 5/2021 | Tsukuba | H04N 19/139 |
| 2021/0211729 | A1 * | 7/2021 | Koo | H04N 19/18 |
| 2021/0218996 | A1 * | 7/2021 | Koo | H04N 19/176 |
| 2022/0303542 | A1 * | 9/2022 | Paluri | H04N 19/46 |
| 2023/0319299 | A1 * | 10/2023 | Wang | H04N 19/436 |

OTHER PUBLICATIONS

Ye-Kui Wang et al., "AHG9: On the subpicture level information SEI message", Joint Video Experts Team (JVET) of ITU-T SG 16 WP 3 and ISO/IEC JTC 1/SC 29/WG 11, Document: JVET-50176-v1, (version 1), 19th Meeting: by teleconference. pp. 1-6, Jun. 22-Jul. 1, 2020, [Retrieved on Aug. 17, 2023], Retrieved from <https://jvet-experts.org/>, see pp. 1-6.

Hendry et al., "AHG9: On subpictures order", Joint Video Experts Team (JVET) of ITU-T SG 16 WP 3 and ISO/IEC JTC 1/SC 29, Document: JVET-AA0099-v1, (version 1), 27th Meeting: by teleconference. pp. 1-4, Jul. 13-22, 2022, [Retrieved on Aug. 17, 2023], Retrieved from https://jvet-experts.org/, see pp. 1-3.

* cited by examiner

| 0 | 1 | 8 | 9 |
|---|---|---|---|
| 2 | 3 | 10 | 11 |
| 4 | 5 | 12 | 13 |
| 6 | 7 | 14 | 15 |

FIG. 19

IMAGE ENCODING/DECODING METHOD AND APPARATUS BASED ON SCAN ORDER INFORMATION, AND RECORDING MEDIUM STORING BITSTREAM

CROSS-REFERENCE TO RELATED APPLICATIONS

This application is a National Stage application under 35 U.S.C. § 371 of International Application No. PCT/KR2023/008254, filed on Jun. 15, 2023, which claims the benefit of and priority to U.S. Provisional Application No. 63/352,646, filed on Jun. 16, 2022. The disclosures of the prior applications are incorporated by reference in their entirety.

TECHNICAL FIELD

The present disclosure relates to an image encoding/decoding method and apparatus and a recording medium for storing a bitstream, and more particularly, to an image encoding/decoding method and apparatus based on scan order information and a recording medium for storing a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

In addition, an object of the present disclosure is to provide an image encoding/decoding method and apparatus based on scan order information.

In addition, an object of the present disclosure is to provide an image encoding/decoding method and apparatus for efficiently signaling scan order information of a partitioning unit.

In addition, an object of the present disclosure is to provide an image encoding/decoding method and apparatus for efficiently signaling scan order information according to a shape of a partitioning unit.

In addition, an object of the present disclosure is to provide a non-transitory computer-readable recording medium storing a bitstream generated by an image encoding method or apparatus according to the present disclosure.

In addition, an object of the present disclosure is to provide a non-transitory computer-readable recording medium storing a bitstream received, decoded and used to reconstruct an image by an image decoding apparatus according to the present disclosure.

In addition, an object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

Technical Solution

According to an embodiment of the present disclosure, an image decoding method performed by an image decoding apparatus may include acquiring a first flag related to subpictures from a bitstream and determining a scan order of the subpictures based on the first flag indicating presence of information on the subpictures.

According to an embodiment of the present disclosure, the scan order of the subpictures may be determined based on a second flag indicating whether the scan order of the subpictures is a raster scan order, and the second flag may be acquired from the bitstream based on the first flag indicating the presence of the information on the subpictures.

According to an embodiment of the present disclosure, the second flag may be acquired from at least one of a sequence parameter set (SPS), general constraints information (GCE), a supplemental enhancement information (SEI) message, or video usage information (VUI).

According to an embodiment of the present disclosure, the second flag may be acquired based on a number of the subpictures exceeding 2.

According to an embodiment of the present disclosure, based on the number of the subpictures being equal to or smaller than 2, a value of the second flag may be constrained to indicate a raster scan order.

According to an embodiment of the present disclosure, based on the second flag being acquired from the SEI message, the second flag may indicate whether the scan order of the subpictures for consecutive coded video sequences (CVSs) is a raster scan order.

According to an embodiment of the present disclosure, based on the second flag being acquired from the SEI message, the second flag may be present before a first VCL NAL unit in a CVS.

According to an embodiment of the present disclosure, the subpictures may include a first subpicture and a second subpicture, and based on a top offset of a first CTU in the first subpicture being smaller than or equal to a top offset of a first CTU in the second subpicture and a left offset of the first CTU in the first subpicture being smaller than a left offset of the first CTU in the second subpicture, the scan order of the subpictures may be determined as a raster scan order.

According to an embodiment of the present disclosure, based further on a left boundary and a top boundary of the first subpicture consisting of a boundary of a current picture including the subpictures or consisting of a boundary of a subpicture decoded after the second subpicture, the scan order of the subpictures may be determined as the raster scan order.

According to an embodiment of the present disclosure, an image encoding method performed by an image encoding apparatus may include determining whether information on subpictures is present and based on the information on the subpictures being present, determining a scan order of the subpictures, and a first flag indicating whether the information on the subpictures is present may be encoded in a bitstream.

According to an embodiment of the present disclosure, in a method for transmitting a bitstream generated by an image encoding method, the image encoding method may include determining whether information on subpictures is present and based on the information on the subpictures being present, determining a scan order of the subpictures, and a first flag indicating whether the information on the subpictures is present may be encoded in a bitstream.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus based on scan order information.

Also, according to the present disclosure, it is possible to provide an image encoding/decoding method and apparatus for efficiently signaling scan order information of a partitioning unit.

Also, according to the present disclosure, it is possible to provide an image encoding/decoding method and apparatus for efficiently signaling scan order information according to a shape of a partitioning unit.

Also, according to the present disclosure, it is possible to provide a non-transitory computer-readable recording medium storing a bitstream generated by an image encoding method or apparatus according to the present disclosure.

Also, according to the present disclosure, it is possible to provide a non-transitory computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 19 is a view showing a subpicture structure according to an embodiment of the present disclosure.

MODE FOR INVENTION

Figure 1:
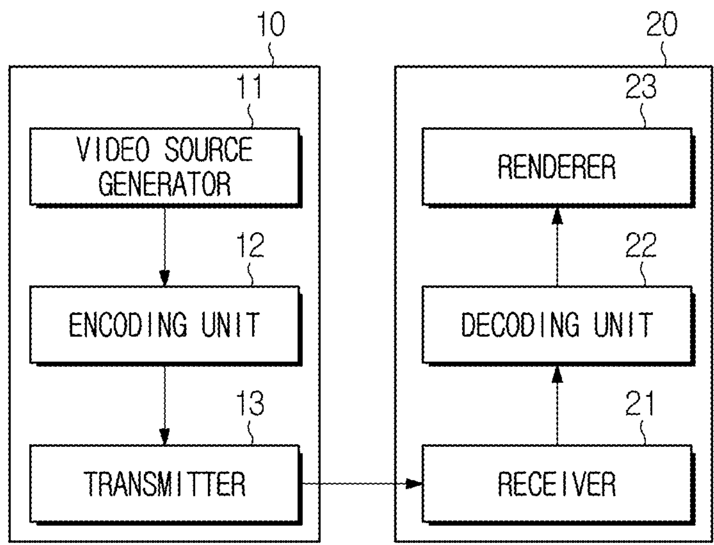
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "video" may mean a set of images over time.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

In the present disclosure, "at least one of A, B, and C" may mean "only A," "only B," "only C," or "any and all combinations of A, B, and C." In addition, "at least one A, B or C" or "at least one A, B and/or C" may mean "at least one A, B and C."

Parentheses used in the present disclosure may mean "for example." For example, if "prediction (intra prediction)" is indicated, "intra prediction" may be proposed as an example of "prediction." In other words, "prediction" in the present disclosure is not limited to "intra prediction," and "intra prediction" may be proposed as an example of "prediction." In addition, even when "prediction (i.e., intra prediction)" is indicated, "intra prediction" may be proposed as an example of "prediction."

Overview of Video Coding System

FIG. 1 is a view schematically showing a video coding system to which an embodiment of the present disclosure is applicable.

The video coding system according to an embodiment may include an encoding device 10 and a decoding device 20. The encoding device 10 may deliver encoded video and/or image information or data to the decoding device 20 in the form of a file or streaming via a digital storage medium or network.

The encoding device 10 according to an embodiment may include a video source generator 11, an encoder 12 and a transmitter 13. The decoding device 20 according to an embodiment may include a receiver 21, a decoder 22 and a renderer 23. The encoder 12 may be called a video/image encoding apparatus, and the decoder 22 may be called a video/image decoding apparatus. The transmitter 13 may be included in the encoder 12. The receiver 21 may be included in the decoder 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoder 12 may encode an input video/image. The encoder 12 may perform a series of procedures such as prediction, transform, and quantization for compression and coding efficiency. The encoder 12 may output encoded data (encoded video/image information) in the form of a bitstream.

The transmitter 13 may transmit the encoded video/image information or data output in the form of a bitstream to the receiver 21 of the decoding device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a separate transmission device from the encoder 120. In this case, the transmission device includes at least one processor that acquires encoded video/image information or data output in the form of a bitstream and a transmitter that delivers it in the form of a file or streaming. The receiver 21 may extract/receive the bitstream from the storage medium or network and transmit the bitstream to the decoder 22.

The decoder 22 may decode the video/image by performing a series of procedures such as dequantization, inverse transform, and prediction corresponding to the operation of the encoder 12.

The renderer 23 may render the decoded video/image. The rendered video/image may be displayed through the display.

Overview of Image Encoding Apparatus

Figure 2:
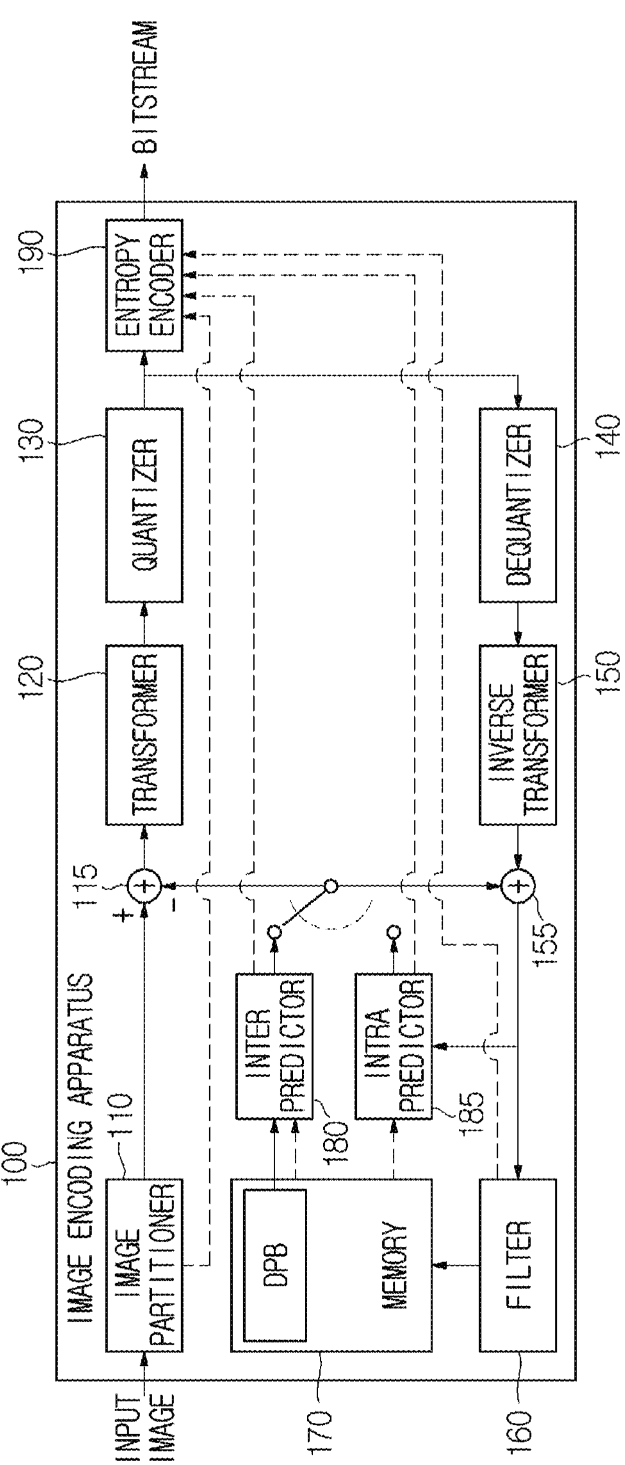
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (LMCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
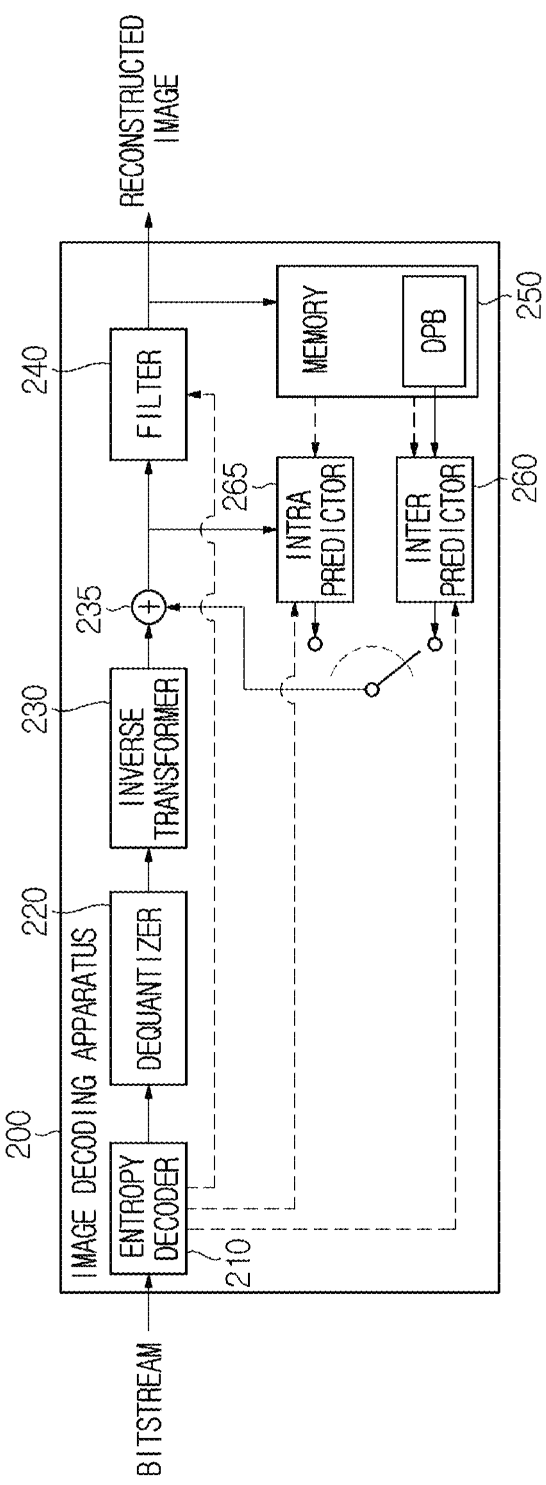
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

A video/image coding method according to the present disclosure may be performed based on a partitioning structure of an image described below. Specifically, the above-described processes of prediction, residual processing ((inverse) transform, (de) quantization, etc.), syntax element coding and filtering may be performed based on a CTU or CU (and/or TU, PU) derived based on the partitioning structure of the image. An image may be partitioned into a block unit, and a block partitioning procedure may be performed in the image partitioner 110 of the above-described image encoding apparatus 100. Partitioning-related information may be encoded in the entropy encoder 190 and be delivered to the image decoding apparatus 200 in a bitstream form. The entropy decoder 210 of the image decoding apparatus 200 may derive a block partitioning structure of a current picture based on the partitioning-related information acquired from the bitstream and perform a series of procedures for image decoding (e.g., prediction, residual processing, block/picture reconstruction, in-loop filtering, etc.) based on the block partitioning structure.

According to the present disclosure, a CU size and a TU size may be equal to each other. Alternatively, a plurality of TUs may be present in a CU region. Meanwhile, a CU size may generally represent a luma component (sample) CB size. A TU size may generally represent a luma component (sample) TB size. A chroma component (sample) CB or TB size may be derived based on a luma component (sample) CB or TB size according to a component proportion according to a color format (chroma format, e.g., 4:4:4, 4:2:2, 4:2:0) of a picture/image. The TU size may be derived based on maxTbSize. For example, when the CU size is greater than the maxTbSize, a plurality of TUs (TBs) of the max TbSize may be derived from the CU, and transform/inverse transform may be performed in the TU (TB) unit. In addition, for example, when intra prediction is applied, an intra prediction mode/type may be derived in the CU (or CB) unit, and a procedure of deriving a neighbor reference sample and generating a prediction sample may be performed in a TU (or TB) unit. In this case, one TU (or TB) or a plurality of TUs (or TBs) may be present in one CU (or CB) region, and in this case, the plurality of TUs (or TBs) may share a same intra prediction mode/type.

In addition, in video/image coding according to the present disclosure, an image processing unit may have a hierarchical structure. One picture may be divided into one or more tiles, bricks, slices and/or tile groups. One slice may include one or more bricks. One brick may include one or more CTU rows in a tile. A slice may include an integer number of bricks. One tile group may include one or more tiles. One tile may include one or more CTUs. The CTU may be partitioned into one or more CUs. A tile is a rectangular region of CTUs within a particular tile column and a particular tile row in a picture. A tile group may include an integer number of tiles according to tile raster scan in a picture. A slice header may carry information/parameter applicable to a corresponding slice (blocks in the slice). In case the image encoding apparatus 100/image decoding apparatus 200 has a multi-core processor, an encoding/decoding procedure for the tile, slice, brick and/or tile group may be parallel processed. In this document, a slice or a tile group may be used interchangeably. That is, a tile group header may be referred to as a slice header. Herein, a slice may have one type of slice types including intra (I) slice, predictive (P) slice, and bi-predictive (B) slice. For blocks in an I slice, inter prediction is not used for prediction, and only intra prediction may be used. Of course, in this case, an original sample value may be coded without prediction and be signaled. For blocks in a P slice, intra prediction or inter prediction may be used, and when inter prediction is used, only uni-prediction may be used. Meanwhile, for blocks in a B slice, intra prediction or inter prediction may be used, and when inter prediction is used, bi-prediction may also be used.

In the image encoding apparatus 100, a tile/tile group, a brick, a slice, and a maximum and minimum coding unit size may be determined according to a feature (e.g., resolution) of a video or by considering efficiency of coding or parallel processing, and information on it or information capable of deriving it may be included in a bitstream.

In the image decoding apparatus 200, it is possible to acquire information indicating whether a CTU in a tile/tile group, a brick, a slice and a tile of a current picture is partitioned into a plurality of coding units. Efficiency may be improved if such information is set to be acquired (transmitted) under a specific condition.

The slice header (slice header syntax) may include information/parameter that is commonly applicable to the slice. An APS (APS syntax) or a PPS (PPS syntax) may include information/parameter that is commonly applicable to one or more pictures. The SPS (SPS syntax) may include information/parameter that is commonly applicable to one or more sequences. The VPS (VPS syntax) may include information/parameter that is commonly applicable to multiple layers. The DPS (DPS syntax) may include information/parameter that is commonly applicable to an overall video. The DPS may include information/parameter related to concatenation of a coded video sequence (CVS).

In the present disclosure, an upper level syntax may include at least one of the APS syntax, the PPS syntax, the SPS syntax, the VPS syntax, the DPS syntax, and the slice header syntax. In addition, for example, information on partitioning and configuration of the tile/tile group/brick/slice may be configured in the image encoding apparatus 100 through the upper level syntax and be delivered to the image decoding apparatus 200 in a bitstream form.

Partitioning of Pictures into Subpictures, Slices, and Tiles

A picture may be partitioned into one or more tile rows and/or one or more tile columns. A tile may be a sequence of CTUs covering a rectangular region of a picture. CTUs in one tile may be scanned in a raster scan order within the tile.

A slice may consist of an integer number of complete tiles or consist of an integer number of consecutive CTU rows included in a tile of a picture. Slices may be present in two modes, that is, in a raster scan slice mode and in a rectangular slice mode. In the raster scan slice mode, one slice may include one or more tiles that are arranged by raster scan in a picture. In the rectangular slice mode, one slice may include an integer number of complete tiles forming a rectangular region in a picture or include an integer number of consecutive complete CTU rows in one tile forming a rectangular region of a picture. Tiles in a rectangular slice may be scanned in a raster scan order in a region of the rectangular slice.

One subpicture may include one or more slices that cover a whole slice region in a picture.

Figure 4:
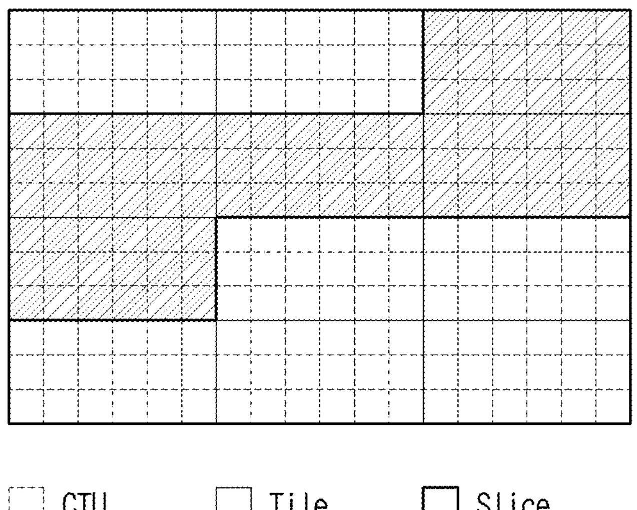
FIG. 4 is a view illustrating an example of partitioning a picture into raster scan slices and tiles.

FIG. 4 is a view illustrating an example of partitioning a picture into raster scan slices and tiles. In FIG. 4, the thick lines may represent the boundaries of slices, the thin lines may mean the boundaries of tiles, and the broken lines may mean the boundaries of CTUs. The picture of FIG. 4 may be partitioned into 12 tiles. In addition, the picture of FIG. 4 may be partitioned into 3 raster scan slices.

Figure 5:
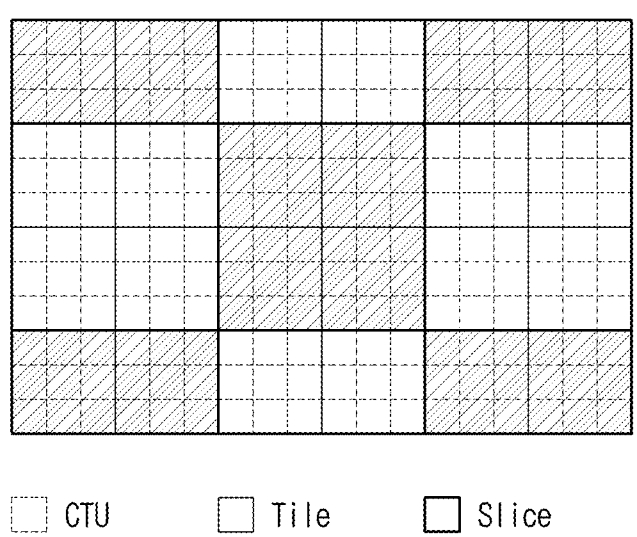
FIG. 5 is a view illustrating an example of partitioning a picture into rectangular slices.

FIG. 5 is a view illustrating an example of partitioning a picture into rectangular slices. In FIG. 5, the thick lines may represent the boundaries of slices, the thin lines may mean the boundaries of tiles, and the broken lines may mean the boundaries of CTUs. The picture of FIG. 5 may be partitioned into 24 tiles (6 tile rows and 4 tile columns). In addition, the picture of FIG. 5 may be partitioned into 9 rectangular slices.

Figure 6:
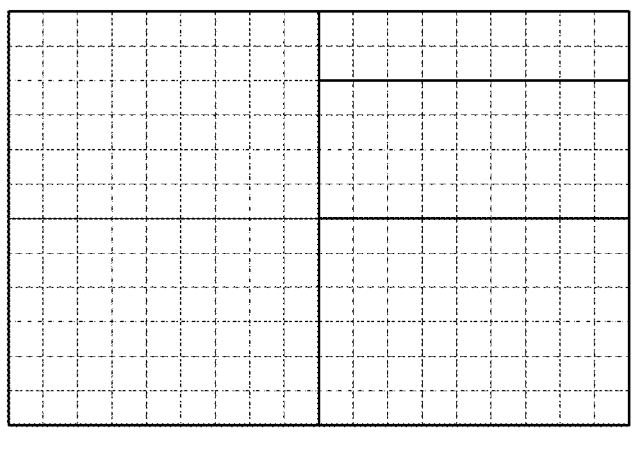
FIG. 6 is a view illustrating an example of partitioning a picture into tiles and rectangular slices.

FIG. 6 is a view illustrating an example of partitioning a picture into tiles and rectangular slices. In FIG. 6, the thick lines may represent the boundaries of slices, the thin lines may mean the boundaries of tiles, and the broken lines may mean the boundaries of CTUs. The picture of FIG. 6 may be partitioned into 4 tiles (2 tile rows and 2 tile columns). In addition, the picture of FIG. 6 may be partitioned into 4 rectangular slices. According to the present disclosure, one tile may include a plurality of slices.

Figure 7:
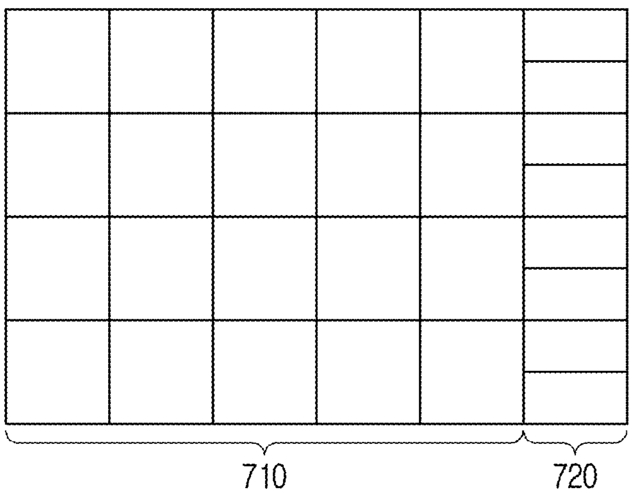
FIG. 7 is a view illustrating an example of picture partitioning.

FIG. 7 is a view illustrating an example of picture partitioning. According to FIG. 7, a picture may be partitioned into 28 subpictures with various sizes. Specifically, a picture may be partitioned into 20 subpictures present in a region 710 and 8 subpictures present in a region 720. The subpictures present in the region 710 and the subpictures present in the region 720 may have different sizes. The present disclosure is not limited thereto, and a picture may be partitioned into various numbers of subpictures with various sizes.

When a picture is encoded using 3 separate color planes (the value of separate_colour_plane_flag is 1), one slice may include only CTUs of one color component identified by a corresponding value of colour_plane_id, and each color component arrangement of a picture may consist of slices with a same colour_plane_id value. Encoded slices with different colour_plane_id values in the picture may be interleaved with each other under a specific constraint. Herein, the specific constraint may be that for a value of each colour_plane_id, an encoded slice NAL unit with the value of a colour_plane_id may be scanned in ascending order of CTU address within a tile scan order for a first CTU of each encoded slice NAL unit.

When the value of separate_colour_plane_flag is 0, each CTU in a picture may be included in one slice. When the value of separate_colour_plane_flag is 1, a CTU of each color component may be included in one slice (i.e., information on each CTU in a picture may be present in 3 slices. Here, the 3 slices may have different values of colour_plane_id.).

Figures 8, 9:
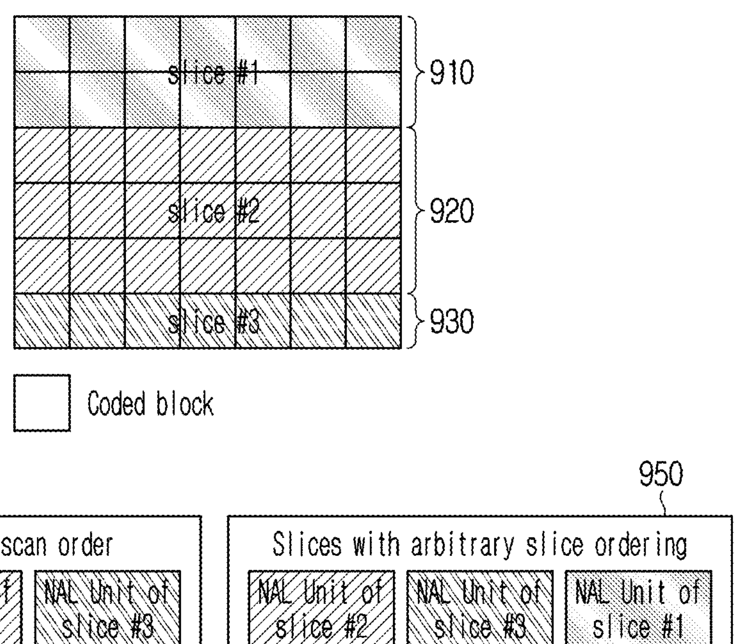
FIG. 8 is a view illustrating an example of partitioning a picture into tiles.
FIG. 9 is a view illustrating a scan order of slices in a picture according to an embodiment of the present disclosure.

FIG. 8 is a view illustrating an example of partitioning a picture into tiles. The picture of FIG. 8 may be partitioned into 2 tiles. Herein, each tile may partitioned into 8 CTUs. A tile may change a scan order of CTUs in a picture. When one picture is partitioned into 2 or more tiles as shown in FIG. 8, a scan order of CTUs may be a raster scan order. For example, the scan order of the picture of FIG. 8 may be a scanning order from 0 to 15. That is, in each tile, the scan order of CTUs may be a raster scan order.

Arbitrary Slice Ordering (ASO)

Generally, a scan order of slices in a picture may be a raster scan order. However, a scan order of slices in a picture may also be an arbitrary scan order (ASO).

FIG. 9 is a view illustrating a scan order of slices in a picture according to an embodiment of the present disclosure. The picture of FIG. 9 may be partitioned into 3 slices 910, 920 and 930. The first slice 910 may be partitioned into 14 coded blocks (i.e., CTUs). The second slice 920 may be partitioned into 21 coded blocks (i.e., CTUs). The third slice 930 may be partitioned into 7 coded blocks (i.e., CTUs). When the slices in the picture are scanned in a raster scan order (940), a scan order of the slices in the picture may be an order of the first slice 910, the second slice 920 and the third slice 930. Meanwhile, when the slices in the picture are scanned in an arbitrary slice order (950), a scan order of the slices in the picture may be an order of the second slice 920, the third slice 930 and the first slice 910.

Problem of the Related Art

In the related art, if a subpicture does not violate a specific condition, a scan order of subpicture is not limited to a raster scan order. Herein, the specific condition is as follows. A subpicture should be shaped such that the entire left boundary and entire top boundary of the subpicture form a boundary of a picture or form a boundary of a previously decoded subpicture.

Figure 10:
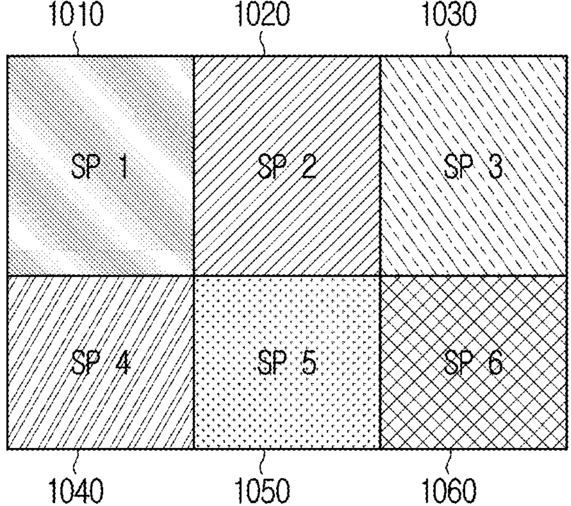
FIG. 10 is a view illustrating a structure of subpictures according to an embodiment of the present disclosure.

FIG. 10 is a view illustrating a structure of subpictures according to an embodiment of the present disclosure. A picture of FIG. 10 includes 6 subpictures 1010, 1020, 1030, 1040, 1050 and 1060. When the scan order of the subpictures is a raster scan order, the subpictures may be scanned in the order of 1010, 1020, 1030, 1040, 1050 and 1060. Alternatively, when the scan order of the subpictures is not a raster scan order, the subpictures may be scanned in the order of 1010, 1040, 1020, 1050, 1030 and 1060.

Generally, the image decoding apparatus 200 may be optimally implemented under the assumption that a scan order of blocks (i.e., CTUs, slices, subpictures) is a raster scan order. However, when the scan order of blocks is not a raster scan order, an additional step or process may be needed. Accordingly, if a scan order of subpictures is determined in a bitstream before decoding actually starts, image decoding efficiency may be improved. Accordingly, the image encoding apparatus 100 may signal specific information through a bitstream so that an actual scan order of subpictures is known to the image decoding apparatus 200. Alternatively, a specific constraint related to a scan order may be included in a bitstream so that an actual scan order of subpictures is known to the image decoding apparatus 200. Hereinafter, the present disclosure will be described with reference to embodiments.

EMBODIMENTS

Embodiments of the present disclosure may include the following features.

1. The image decoding apparatus 200 may signal a flag (hereinafter, referred to as 'scan order flag') indicating whether a scan order of a subpicture is a raster scan order.

2. A scan order flag may indicate not only a scan order of a subpicture but also a scan order of other partitioning units (i.e., slice, tile, CTU, CU). That is, a scan order flag may include information on a partitioning unit.

3. It may be constrained that a scan order flag is present only when the number of subpictures exceeds 2. Alternatively, it may be constrained that the value of a scan order flag represents a raster scan order when there are 2 or less subpictures.

4. A scan order flag may be signaled from at least one of a sequence parameter set (SPS), general constraints information (GCI), a supplemental enhancement information (SEI) message, or video usage information (VUI).

5. When a scan order flag is signaled from a SEI message, the range of the SEI message may be one or more coded video sequences (CVSs). In this case, the scan order flag may indicate, for consecutive CVSs, whether a scan order of subpictures is a raster scan order. Specifically, a scan order flag may be applied to consecutive CVSs until it is replaced by another SEI message of a same type. If a scan order flag is present in a SEI message, the SEI message may be constrained to be present before a first VCL NAL unit in a CVS.

6. Instead of signaling a scan order flag to indicate a scan order of a subpicture, if a raster scan order is available for a given structure of a subpicture in a bitstream, the scan order of the subpicture may be limited to the raster scan order. That is, when the structure of a subpicture satisfies a specific condition, a scan order of the subpicture may be limited to a raster scan order.

Although the above features are described based on the image decoding apparatus 200, they may also be applied to the image encoding apparatus 100. In addition, the flag is described in relation to a subpicture, but it may also be applied to another partitioning unit (i.e., slice, tile, CTU, CU).

Figure 11:
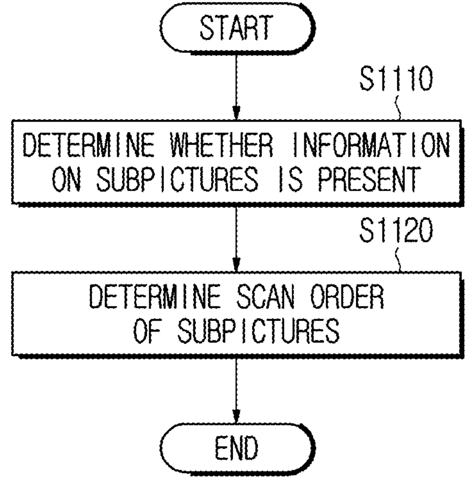
FIG. 11 is a flowchart showing an image encoding order according to an embodiment of the present disclosure.

FIG. 11 is a flowchart showing an image encoding order according to an embodiment of the present disclosure. Referring to FIG. 11, the image encoding apparatus 100 may determine whether information on subpictures is present in a bitstream (S1110).

The image encoding apparatus 100 may determine a scan order of subpictures (S1120). According to an embodiment of the present disclosure, based on the determined scan order of subpictures, the image encoding apparatus 100 may encode a flag (hereinafter, referred to as 'second flag') indicating the scan order of subpictures. Herein, the second flag may be various flags such as sps_subpics_in_raster_scan_order_flag, gci_subpictures_in_raster_scan_only_constraint_flag, soi_subpics_in_raster_scan_order_flag, and poi_partitioning_units_in_raster_scan_order_flag. In addition, the second flag may be a flag indicating a scan order of not only subpictures but also various partitioning units. According to another embodiment of the present disclosure, a scan order of a subpicture may be determined based on a shape of the subpicture. In this case, encoding of the second flag may be skipped.

Figure 12:
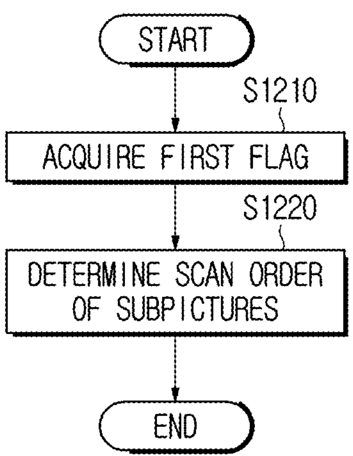
FIG. 12 is a flowchart showing an image decoding order according to an embodiment of the present disclosure.

FIG. 12 is a flowchart showing an image decoding order according to an embodiment of the present disclosure. Referring to FIG. 12, the image decoding apparatus 200 may acquire a first flag (S1210). Herein, the first flag may be a flag indicating whether information on subpictures is present in a bitstream (i.e., sps_subpic_info_present_flag, gci_present_flag).

The image decoding apparatus 200 may determine a scan order of subpictures (S1220). According to an embodiment of the present disclosure, the image decoding apparatus 200 may acquire a second flag from a bitstream. In this case, the scan order of subpictures may be determined based on the second flag. According to another embodiment of the present disclosure, the image decoding apparatus 200 may skip a process of acquiring the second flag from a bitstream. In this case, a scan order of subpictures may be determined based on a shape of the subpictures.

Herein, various embodiments combining main features of the present disclosure will be described. Embodiments according to the present disclosure are not limited to the following embodiments, and the above-described features 1 to 6 may be combined in various forms.

According to an embodiment of the present disclosure, by signaling a second flag, an additional procedure or process for checking (or determining) a scan order of a partitioning unit may be omitted. Accordingly, the present disclosure may improve coding performance and efficiency. In addition, when a shape of a partitioning unit satisfies a predetermined condition, coding efficiency may be improved by skipping signaling of the second flag.

Embodiment 1

According to the present disclosure, the image encoding apparatus 100 or the image decoding apparatus 200 may signal a flag indicating a scan order of a partitioning unit through an SPS. Table 1 below may show an SPS syntax structure to which Embodiment 1 may be applied. The syntax structure of Table 1 may be applied to an embodiment according to FIG. 13 or FIG. 14.

TABLE 1

| | Descriptor |
|---|---|
| seq_parameter_set_rbsp( ) { | |
| ... | |
| sps_subpic_info_present_flag | u(1) |
| if( sps_subpic_info_present_flag ) { | |
| sps_num_subpics_minus1 | ue(v) |
| if( sps_num_subpics_minus1 > 0 ) { | |
| sps_independent_subpics_flag | u(1) |
| sps_subpic_same_size_flag | u(1) |
| } | |
| for( i = 0; sps_num_subpics_minus1 > 0 && i <= sps_num_subpics_minus1; i++ ) { | |
| ... | |
| } | |
| if( sps_num_subpics_minus1 > 1 ) | |
| sps_subpics_in_raster_scan_order_flag | u(1) |
| sps_subpic_id_len_minus1 | ue(v) |
| ... | |
| } | |
| ... | |
| } | |

Figure 13:
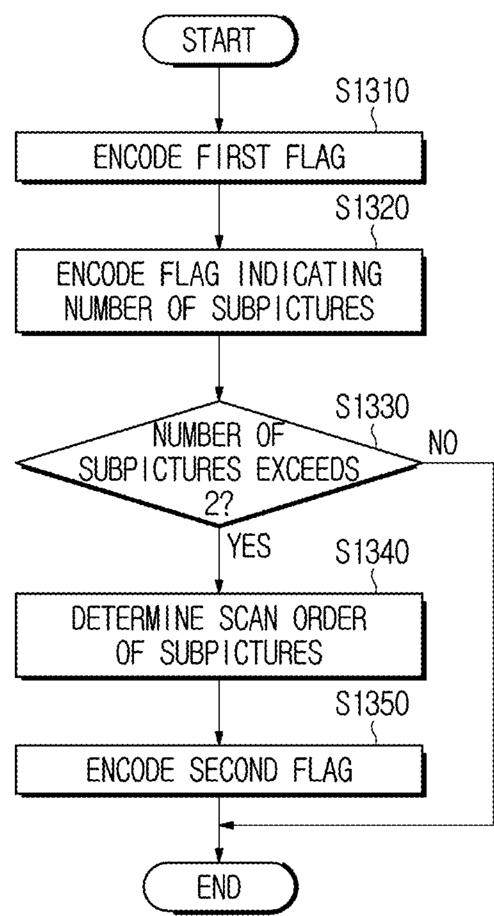
FIG. 13 is a flowchart of an image encoding method for determining a scan order according to an embodiment of the present disclosure.

FIG. 13 is a flowchart of an image encoding method for determining a scan order according to an embodiment of the present disclosure. The image encoding apparatus 100 encodes a first flag (S1310). Herein, the first flag may be sps_subpic_info_present_flag. In addition, the first flag may be signaled through an SPS.

The image encoding apparatus 100 may encode a flag indicating the number of subpictures (S1320). Herein, the number of subpictures may be determined based on the first flag. Herein, the flag indicating the number of subpictures may be sps_num_subpics_minus1. In addition, the flag indicating the number of subpictures may be signaled through an SPS.

The image encoding apparatus 100 may check whether the number of subpictures exceeds 2 (S1330). If the number of subpictures exceeds 2 (YES at step S1330), the image encoding apparatus 100 may determine a scan order of subpictures (S1340). On the other hand, if the number of subpictures does not exceed 2 (that is, the number of subpictures is equal to or smaller than 2) (NO at step S1330), the image encoding apparatus 100 may terminate the procedure.

The image encoding apparatus 100 may encode the second flag based on the determined scan order of subpictures (S1350). Herein, the second flag may be sps_subpics_in_raster_scan_order_flag. When the second flag has a value of 1, the scan order of subpictures in a CLVS may be a raster scan order. When the second flag has a value of 0, the scan order of subpictures in the CLVS may not be a raster scan order. Alternatively, when the second flag has a value of 0, the scan order of subpictures in the CLVS may not be limited to a raster scan order.

Each of the steps of FIG. 13 is not constrained to the above-described order, and an order of each of the steps may be changed. Alternatively, each of the steps may be performed simultaneously. For example, steps S1310 and S1320 may be performed at any step after step S1330 and may be performed simultaneously.

Figure 14:
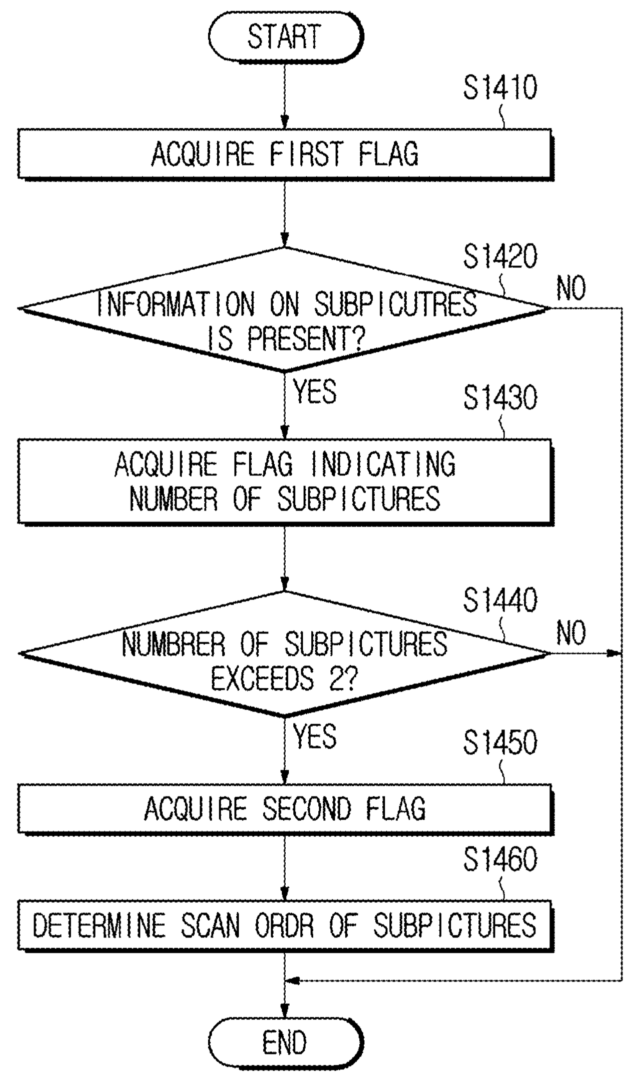
FIG. 14 is a flowchart of an image decoding method for determining a scan order according to an embodiment of the present disclosure.

FIG. 14 is a flowchart of an image decoding method for determining a scan order according to an embodiment of the present disclosure. Referring to FIG. 14, the image decoding apparatus 200 may acquire a first flag (S1410). Herein, the first flag may be sps_subpic_info_present_flag. In addition, the first flag may be acquired through an SPS.

The image decoding apparatus 200 may check whether information on subpictures is present in a CLVS (S1420). That is, based on the first flag, the image decoding apparatus 200 may check whether the information on subpictures is present in the CLVS. For example, when the first flag has a value of 1, the information on subpictures may be present in the CLVS. When the first flag has a value of 0, the information on subpictures may not be present in the CLVS.

If the information on subpictures is present in the CLVS (YES of step S1420), the image decoding apparatus 200 may acquire a flag indicating the number of subpictures (S1430). Herein, the flag indicating the number of subpictures may be sps_num_subpics_minus1. In addition, the flag indicating the number of subpictures may be acquired through an SPS. On the other hand, if the information on subpictures is not present in the CLVS (NO of step S1420), the image decoding apparatus 200 may terminate the procedure.

The image decoding apparatus 200 may check whether the number of subpictures exceeds 2 (S1440). Herein, whether the number of subpictures exceeds 2 may be determined based on a flag indicating the number of subpictures. If the number of subpictures does not exceed 2 (NO at step S1440), the image decoding apparatus 200 may terminate the procedure. On the other hand, if the number of subpictures exceeds 2 (YES at step S1440), the image decoding apparatus 200 may acquire a second flag (S1450). Herein, the second flag may be sps_subpics_in_raster_scan_order_flag. According to an embodiment of the present disclosure, the second flag may be acquired through an SPS.

The image decoding apparatus 200 may determine a scan order of subpictures (S1460). The scan order of subpictures may be determined based on the second flag. For example, when the second flag has a value of 1, the scan order of subpictures in a CLVS may be a raster scan order. When the second flag has a value of 0, the scan order of subpictures in the CLVS may be limited to any other scan order than the raster scan order.

According to another embodiment of the present disclosure, when the second flag has a value of 0, the scan order of subpictures in the CLVS may not be a raster scan order. That is, when the second flag has the value of 0, the scan order of subpictures in the CLVS may be or may not be a raster scan order.

According to an embodiment, by signaling a second flag, an additional procedure or process for checking (or determining) a scan order of a partitioning unit may be omitted. Accordingly, the present disclosure may improve coding performance and efficiency.

Embodiment 2

According to the present disclosure, the image encoding apparatus 100 or the image decoding apparatus 200 may signal a flag indicating a scan order of a partitioning unit through a GCI. Table 2 below may show a GCI syntax structure to which Embodiment 2 may be applied. The syntax structures of Table 2 and Table 3 may be applied to an embodiment according to FIG. 15 or FIG. 16.

TABLE 2

| | Descriptor |
|---|---|
| general_constraints_info( ) { | |
| gci_present_flag | u(1) |
| if( gci_present_flag ) { | |
| /* general */ | |
| gci_intra_only_constraint_flag | u(1) |
| gci_all_layers_independent_constraint_flag | u(1) |
| gci_one_au_only_constraint_flag | u(1) |
| gci_partitioning_units_in_raster_scan_only_constraint_flag | u(1) |
| ... | |
| } | |
| while( !byte_aligned( ) ) | |
| gci_alignment_zero_bit | f(1) |
| } | |

TABLE 3

| | Descriptor |
|---|---|
| general_constraints_info( ) { | |
| gci_present_flag | u(1) |
| if( gci_present_flag ) { | |
| /* general */ | |
| gci_intra_only_constraint_flag | u(1) |
| gci_all_layers_independent_constraint_flag | u(1) |
| gci_one_au_only_constraint_flag | u(1) |

TABLE 3-continued

| | Descriptor |
|---|---|
| gci_subpictures_in_raster_scan_only_constraint_flag | u(1) |
| ... | |
| } | |
| while( !byte_aligned( ) ) | |
| gci_alignment_zero_bit | f(1) |
| } | |

Figure 15:
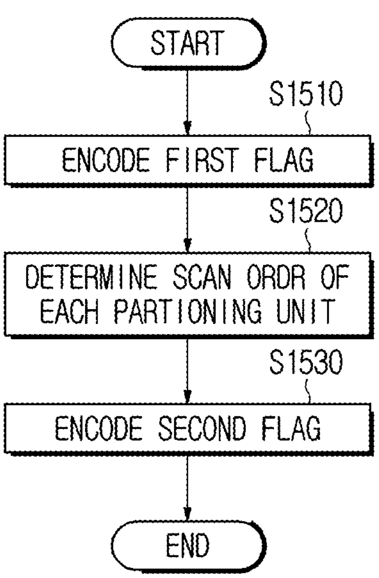
FIG. 15 is a flowchart of an image encoding method for determining a scan order according to an embodiment of the present disclosure.

FIG. 15 is a flowchart of an image encoding method for determining a scan order according to an embodiment of the present disclosure. The image encoding apparatus 100 may encode a first flag (S1510). Herein, the first flag may be gci_present_flag. gci_present_flag may be a flag indicating whether a GCI syntax element is present in a GCI syntax structure.

The image encoding apparatus 100 may determine a scan order of each partitioning unit (S1520). Herein, each partitioning unit may mean a slice, a tile, a CTU, a CU and the like. The scan order of each partitioning unit may be determined based on the first flag.

The image encoding apparatus 100 may encode a second flag (S1530). According to an embodiment present disclosure, the second flag may be gci_partitioning_units_in_raster_scan_only_constraint_flag. When gci_partitioning_units_in_raster_scan_only_constraint_flag has a value of 1, the scan order of each partitioning unit may be limited to a scan order. When gci_partitioning_units_in_raster_scan_only_constraint_flag has a value of 0, the scan order of each partitioning order may not be limited to a raster scan order.

According to another embodiment of the present disclosure, the second flag may be gci_subpictures_in_raster_scan_only_constraint_flag. When gci_subpictures_in_raster_scan_only_constraint_flag has a value of 1, a scan order of subpicture may be limited to a raster scan order. When gci_subpictures_in_raster_scan_only_constraint_flag has a value of 0, the scan order of subpicture may not be limited to the raster scan order.

Each of the steps of FIG. 15 is not constrained to the above-described order, and an order of each of the steps may be changed. Alternatively, each of the steps may be performed simultaneously. For example, steps S1510 and S1520 may change their order, and the present disclosure is not limited thereto.

Figure 16:
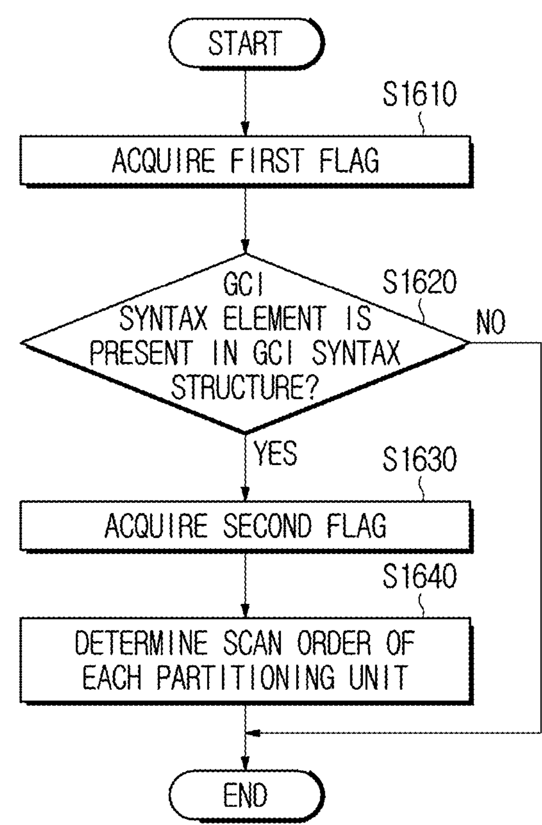
FIG. 16 is a flowchart of an image decoding method for determining a scan order according to an embodiment of the present disclosure.

FIG. 16 is a flowchart of an image decoding method for determining a scan order according to an embodiment of the present disclosure. The image decoding apparatus 200 may acquire a first flag. Herein, the first flag may be gci_present_flag. gci_present_flag may be a flag indicating whether a GCI syntax element is present in a GCI syntax structure.

The image decoding apparatus 200 may check whether a GCI syntax element is present in a GCI syntax structure (S1620). Whether the GCI syntax element is present in the GCI syntax structure may be determined based on the first flag. When the GCI syntax element is not present in the GCI syntax structure (NO at step S1620), the image decoding apparatus 200 may terminate the procedure. On the other hand, when the GCI syntax element is present in the GCI syntax structure (YES at step S1620), the image decoding apparatus 200 may acquire a second flag (S1630). According to an embodiment of the present disclosure, the second flag may be gci_partitioning_units_in_raster_scan_only_constraint_flag. When gci_partitioning_units_in_raster_scan_only_constraint_flag has a value of 1, the scan order of each partitioning unit may be limited to a raster scan order. When gci_partitioning_units_in_raster_scan_only_constraint_flag has a value of 0, the scan order of each partitioning unit may not be limited to the raster scan order.

According to another embodiment of the present disclosure, the second flag may be gci_subpictures_in_raster_scan_only_constraint_flag. When gci_subpictures_in_raster_scan_only_constraint_flag has a value of 1, a scan order of subpicture may be limited to a raster scan order. When gci_subpictures_in_raster_scan_only_constraint_flag has a value of 0, the scan order of subpicture may not be limited to the raster scan order. The second flag may be acquired through GCI.

The image decoding apparatus 200 may determine the scan order of each partitioning unit (S1640). The scan order of each partitioning unit may be determined based on the second flag. When the second flag has a value of 1, the scan order of each partitioning unit may be limited to a raster scan order. On the other hand, when the second flag has a value of 0, the scan order of each portioning unit may not be limited to the raster scan order.

According to an embodiment of the present disclosure, by signaling a second flag, an additional procedure or process for checking (or determining) a scan order of a partitioning unit may be omitted. Accordingly, the present disclosure may improve coding performance and efficiency.

Embodiment 3

According to the present disclosure, the image encoding apparatus 100 or the image decoding apparatus 200 may signal a second flag through a subpicture order information (SOI) SEI message or a partitioning unit order information (POI) SEI message. Table 4 below shows a syntax structure of an SOI SEI message to which Embodiment 3 may be applied. Table 5 below shows a syntax structure of a POI SEI message to which Embodiment 3 may be applied. The syntax structures of Table 4 and Table 5 may be applied to an embodiment according to FIG. 17 or FIG. 18.

TABLE 4

| | Descriptor |
|---|---|
| subpic_order_info( payloadSize ) { | |
| soi_subpics_in_raster_scan_order_flag | u(1) |
| } | |

TABLE 5

| | Descriptor |
|---|---|
| partitioning_unit_order_info( payloadSize ) { | |
| poi_partitioning_units_in_raster_scan_order_flag | u(1) |
| } | |

According to the present disclosure, an SOI SEI message may include information on an order of subpictures in a picture. Herein, the subpictures may be included in a picture in a CVS set of an OLS to which the SEI message indicated as targetCvss is applied when conformance of an extracted bitstream including a subpicture sequence is tested. An OLS, to which an SOI message is applied, may be an applicable OLS or an associated OLS. A CVS mentioned in the present disclosure may mean a CVS of an applicable OLS but is not limited thereto, and a CVS may be an associated OLS.

When an SOI SEI message is present for every access unit (AU) of a CVS, the SOI SEI message may be present for a first AU of the CVS and be present before a first VCL NAL unit of the AU. Even when an SOI SEI message is not present for every AU of a CVS, the SOI SEI message may be present in a bitstream or may be provided through an external means not specified in the present disclosure. Also, in this case, the SOI SEI message may be present for a first AU of a CVS and may be present before a first VCL NAL unit of the AU. The SOI SEI message may keep a decoding order from a current AU to a next AU including a different content from the current SOI SEI message. That is, the SOI SEI message may be applied from the current AU to the next AU including a different flag from the current SOI SEI message. Alternatively, the SOI SEI message may keep a decoding order from a current AU to the end of a bitstream. That is, the SOI SEI message may apply a same flag (a flag indicating a scan order) from the current AU to the end of the bitstream. According to the present disclosure, every SOI SEI message applied to a same CVS may have a same content.

According to another embodiment, a POI SEI message may include information on an order of subpictures in a picture. Herein, the subpictures may be included in a picture in a CVS set of an OLS to which an SEI message indicated as targetCvss is applied when conformance of an extracted bitstream including a subpicture sequence is tested. An OLS, to which the POI message is applied, may be an applicable OLS or an associated OLS. A CVS mentioned in the present disclosure may mean a CVS of an applicable OLS but is not limited thereto, and a CVS may be an associated OLS.

When a POI SEI message is present for every AU of a CVS, the POI SEI message may be present for a first AU of the CVS and be present before a first VCL NAL unit of the AU. Even when a POI SEI message is not present for every AU of a CVS, the POI SEI message may be present in a bitstream or may be provided through an external means not specified in the present disclosure. Also, in this case, the POI SEI message may be present for a first AU of a CVS and may be present before a first VCL NAL unit of the AU. The POI SEI message may keep a decoding order from a current AU to a next AU including a different content from the current POI SEI message. That is, the POI SEI message may be applied from the current AU to the next AU including a different flag from the current POI SEI message. Alternatively, the POI SEI message may keep a decoding order from a current AU to the end of a bitstream. That is, the POI SEI message may apply a same flag (a flag indicating a scan order) from the current AU to the end of the bitstream.

According to the present disclosure, every POI SEI message applied to a same CVS may have a same content.

Figure 17:
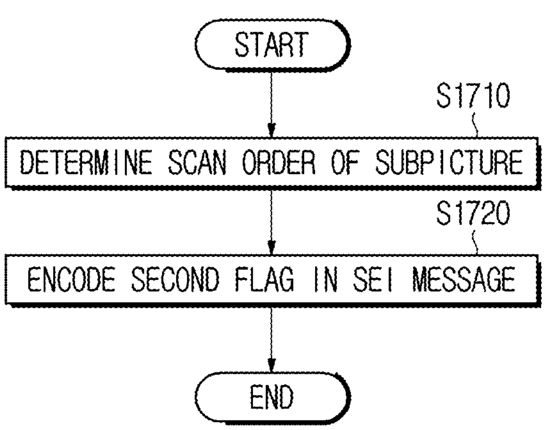
FIG. 17 is a flowchart of an image encoding method for determining a scan order according to an embodiment of the present disclosure.

FIG. 17 is a flowchart of an image encoding method for determining a scan order according to an embodiment of the present disclosure. The image encoding apparatus 100 may determine a scan order of subpicture (S1710). Specifically, the image encoding apparatus 100 may determine whether the scan order of subpicture is a raster scan order.

The image encoding apparatus 100 may encode a second flag in an SEI message (S1720). According to an embodiment of the present disclosure, the second flag may be soi_subpics_in_raster_scan_order_flag. When soi_subpics_in_raster_scan_order_flag has a value of 1, the scan order of subpicture may be a raster scan order. When soi_subpics_in_raster_scan_order_flag has a value of 0, the scan order of subpicture may not be a raster scan order. Alternatively, when soi_subpics_in_raster_scan_order_flag has the value of 0, the scan order of subpicture may not be limited to the raster scan order.

According to another embodiment of the present disclosure, the second flag may be poi_partitioning_units_in_raster_scan_order_flag. When poi_partitioning_units_in_raster_scan_order_flag has a value of 1, the scan order of subpicture may be a raster scan order. When poi_partitioning_units_in_raster_scan_order_flag has a value of 0, the scan order of subpicture may not be a raster scan order. Alternatively, when poi_partitioning_units_in_raster_scan_order_flag has the value of 0, the scan order of subpicture may not be limited to the raster scan order. An SEI message signaling the second flag may be an SOI SEI message or a POI SEI message, but the present disclosure is not limited thereto.

Figure 18:
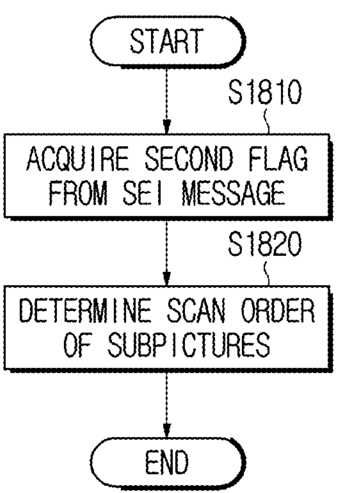
FIG. 18 is a flowchart of an image decoding method for determining a scan order according to an embodiment of the present disclosure.

FIG. 18 is a flowchart of an image decoding method for determining a scan order according to an embodiment of the present disclosure. The image decoding apparatus 200 may acquire a second flag from an SEI message (S1810). Herein, the second flag may be soi_subpics_in_raster_scan_order_flag or poi_partitioning_units_in_raster_scan_order_flag. An SEI message signaling the second flag may be an SOI SEI message or a POI SEI message, but the present disclosure is not limited thereto.

The image decoding apparatus 200 may determine a scan order of subpictures (S1820). Specifically, the scan order of subpictures may be determined based on the second flag. When the second flag has a value of 1, the scan order of subpictures may be a raster scan order. When the second flag has a value of 0, the scan order of subpictures may not be a raster scan order. Alternatively, when the second flag has the value of 0, the scan order of subpictures may not be limited to the raster scan order.

According to an embodiment of the present disclosure, by signaling a second flag, an additional procedure or process for checking (or determining) a scan order of a partitioning unit may be omitted. Accordingly, the present disclosure may improve coding performance and efficiency.

Embodiment 4

According to an embodiment of the present disclosure, when a subpicture has a specific shape, signaling of a second flag may be skipped. That is, when the subpicture has the specific shape, the second flag may not be signaled, and a scan order may be determined or limited to a predetermined scan order.

For example, when the entire left boundary and entire top boundary of a subpicture are formed by a boundary of a picture or are formed by a boundary of a previously decoded subpicture (when the subpicture has a specific shape), signaling of a second flag may be skipped. In this case, the scan order of the subpicture may be limited to a raster scan order. A shape of a subpicture capable of restricting signaling of a second flag may be various.

Figure 19:
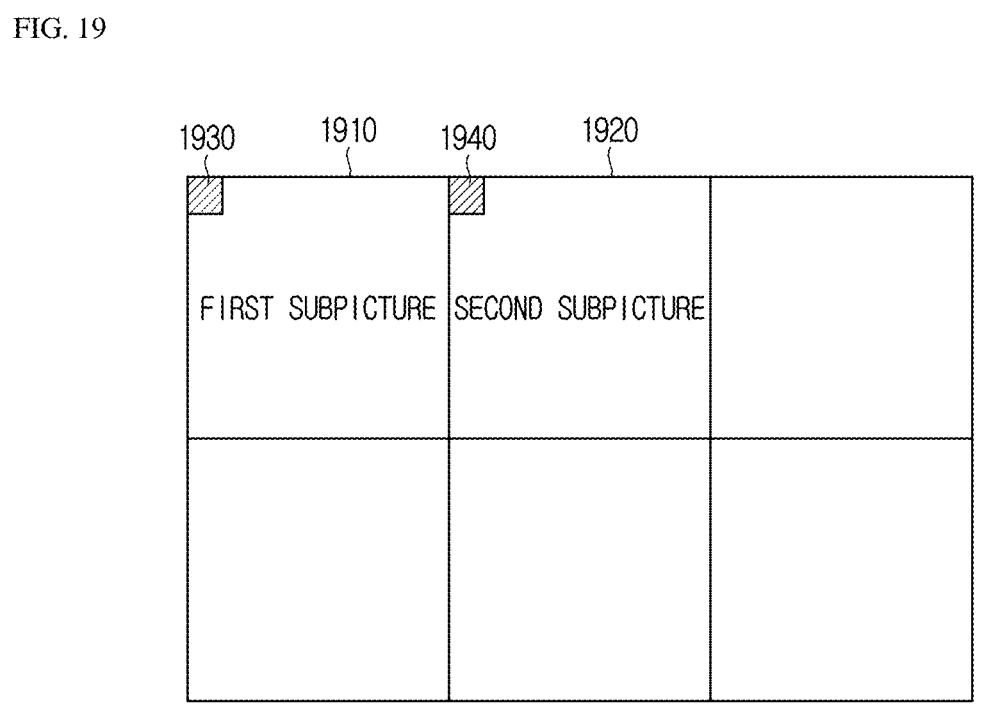

FIG. 19 is a view showing a subpicture structure according to an embodiment of the present disclosure. According to an embodiment of the present disclosure, when a top offset of a first CTU 1930 of a subpicture A 1910 is smaller than a top offset of a first CTU 1940 of a subpicture B 1920 and the entire left boundary and entire top boundary of the subpicture A 1920 correspond to a boundary of a picture, signaling of a second flag may be skipped. In this case, the scan order of the subpicture may be limited to a raster scan order.

According to another embodiment of the present disclosure, when the top offset of the first CTU 1930 of the subpicture A 1910 is smaller than the top offset of the first CTU 1940 of the subpicture B 1920 and the entire left boundary and entire top boundary of the subpicture A 1920 directly/indirectly form a boundary of a subpicture, prior to which the subpicture B is to be decoded, the signaling of the second flag may be skipped. That is, when the top offset of the first CTU 1930 of the subpicture A 1910 is smaller than the top offset of the first CTU 1940 of the subpicture B 1920 and forms a boundary of a subpicture to be decoded after the subpicture B, the signaling of the second flag may be skipped. In this case, the scan order of the subpicture may be limited to a raster scan order.

According to another embodiment of the present disclosure, when the top offset of the first CTU 1930 of the subpicture A 1910 is equal to the top offset of the first CTU 1940 of the subpicture B 1920, a left offset of the first CTU 1930 of the subpicture A 1910 is smaller than a left offset of the first CTU 1940 of the subpicture B 1920, and the entire left boundary and entire top boundary of the subpicture A 1920 correspond to a boundary of a picture, the signaling of the second flag may be skipped. In this case, the scan order of the subpicture may be limited to a raster scan order.

According to another embodiment of the present disclosure, when the top offset of the first CTU 1930 of the subpicture A 1910 is equal to the top offset of the first CTU 1940 of the subpicture B 1920, the left offset of the first CTU 1930 of the subpicture A 1910 is smaller than the left offset of the first CTU 1940 of the subpicture B 1920, and the entire left boundary and entire top boundary of the subpicture A 1920 directly/indirectly form a boundary of a subpicture, prior to which the subpicture B is to be decoded, the signaling of the second flag may be skipped. That is, when the top offset of the first CTU 1930 of the subpicture A 1910 is equal to the top offset of the first CTU 1940 of the subpicture B 1920 and the left offset of the first CTU 1930 of the subpicture A 1910 is smaller than the left offset of the first CTU 1940 of the subpicture B 1920 and forms a boundary of a subpicture to be decoded after the subpicture B, the signaling of the second flag may be skipped. In this case, the scan order of the subpicture may be limited to a raster scan order.

According to another embodiment of the present disclosure, when the subpicture A 1910 is decoded before the subpicture B 1920 and the top offset of the first CTU 1930 of the subpicture A 1910 is smaller than the top offset of the first CTU 1940 of the subpicture B 1920, the signaling of the second flag may be skipped.

According to another embodiment of the present disclosure, when the subpicture A 1910 is decoded before the subpicture B 1920, the top offset of the first CTU 1930 of the subpicture A 1910 is equal to the top offset of the first CTU 1940 of the subpicture B 1920, and the left offset of the first CTU 1930 of the subpicture A 1910 is smaller than the left offset of the first CTU 1940 of the subpicture B 1920, the signaling of the second flag may be skipped. In this case, the scan order of the subpicture may be limited to a raster scan order.

Figure 20:
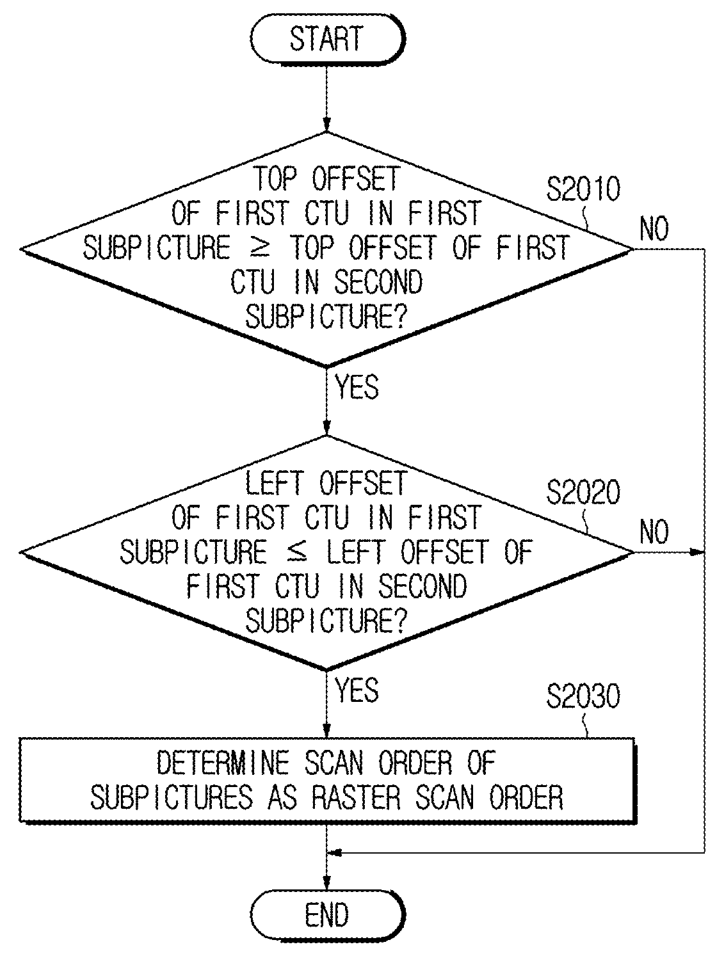
FIG. 20 is a flowchart of a process of determining a scan order of subpicture according to an embodiment of the present disclosure.

FIG. 20 is a flowchart of a process of determining a scan order of subpicture according to an embodiment of the present disclosure. Hereinafter, embodiments according to FIG. 20 are described to be performed in the image encoding apparatus 100, but a corresponding operation or a same operation may be performed in the image decoding apparatus 200.

The image encoding apparatus 100 may check whether a top offset of a first CTU in a first subpicture is greater than or equal to a top offset of a first CTU in a second subpicture (S2010). If the top offset of the first CTU in the first subpicture is smaller than the top offset of the first CTU in the second subpicture (NO at step S2010), the image encoding apparatus 100 may terminate the procedure. Herein, a top offset may mean a distance between a top boundary of a first subpicture and a top boundary of a CTU or a y coordinate of the CTU.

If the top offset of the first CTU in the first subpicture is greater than or equal to the top offset of the first CTU in the second subpicture (YES at step S2010), the image encoding apparatus 100 may check whether a left offset of the first CTU in the first subpicture is smaller than a left offset of the first CTU in the second subpicture (S2020). Herein, a left offset may mean a distance between a left boundary of a first subpicture and a left boundary of a CTU or mean an x coordinate of the CTU. When the left offset of the first CTU in the first subpicture is greater than or equal to the left offset of the first CTU in the second subpicture (NO at step S2020), the image encoding apparatus 100 may terminate the procedure.

When the left offset of the first CTU in the first subpicture is smaller than the left offset of the first CTU in the second subpicture (YES at step S2020), the image encoding apparatus 100 may determine the scan order of subpictures as a raster scan order (S2030). In this case, the image encoding apparatus 100 may skip encoding of a second flag.

The order of the steps of FIG. 20 is not limited to the above-described order. The order of each step may be changed, and the steps may be performed simultaneously. For example, step S2010 and step S2020 may change their order to be performed or be simultaneously performed.

According to an embodiment of the present disclosure, when a shape of a partitioning unit satisfies a predetermined condition, coding efficiency may be improved by skipping signaling of a second flag.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 21:
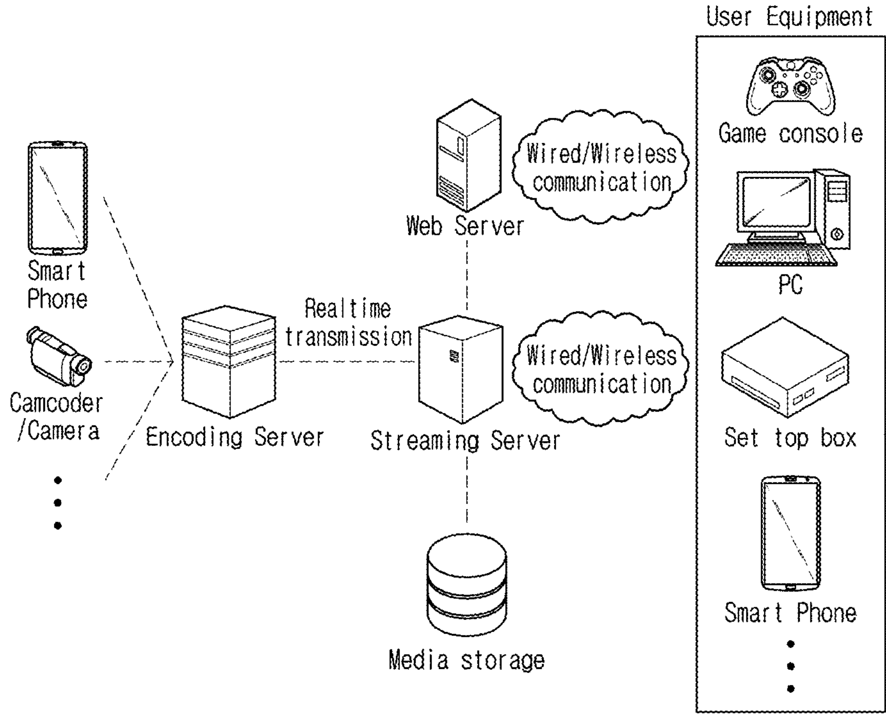
FIG. 21 is a view showing a content streaming system to which an embodiment of the present disclosure is applicable.

FIG. 21 is a view showing a content streaming system, to which an embodiment of the present disclosure is applicable.

As shown in FIG. 21, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

acquiring a first flag related to subpictures from a bitstream, wherein the first flag specifies whether or not the subpictures are present, wherein the bitstream further includes information for specifying a number of subpictures, information for specifying whether or not all subpictures have a same width and a same height, and information for specifying a number of bits used to represent a subpicture identifier; and determining a scan order of the subpictures based on the first flag indicating presence of information on the subpictures, wherein the scan order of the subpictures is determined based on a second flag indicating whether the scan order of the subpictures is a raster scan order, and wherein based on the second flag being acquired from a supplemental enhancement information (SEI) message, the second flag is present before a first video coding layer (VCL) network abstraction layer (NAL) unit in a coded video sequence (CVS).

2. The image decoding method of claim 1, wherein the second flag is acquired from the bitstream based on the first flag indicating the presence of the information on the subpictures.

3. The image decoding method of claim 2, wherein the second flag is acquired from at least one of a sequence parameter set (SPS), general constraints information (GCE), SEI message, or video usage information (VUI).

4. The image decoding method of claim 2, wherein the second flag is acquired based on a number of the subpictures exceeding 2.

5. The image decoding method of claim 2, wherein based on the number of the subpictures being equal to or smaller than 2, a value of the second flag is constrained to indicate a raster scan order.

6. The image decoding method of claim 3, wherein based on the second flag being acquired from the SEI message, the second flag indicates whether the scan order of the subpictures for consecutive CVSs is a raster scan order.

7. The image decoding method of claim 1, wherein the subpictures include a first subpicture and a second subpicture, and wherein based on a top offset of a first coding tree unit (CTU) in the first subpicture being smaller than or equal to a top offset of a first CTU in the second subpicture and a left offset of the first CTU in the first subpicture being smaller than a left offset of the first CTU in the second subpicture, the scan order of the subpictures is determined as a raster scan order.

8. The image decoding method of claim 7, wherein based further on a left boundary and a top boundary of the first subpicture consisting of a boundary of a current picture including the subpictures or consisting of a boundary of a subpicture decoded after the second subpicture, the scan order of the subpictures is determined as the raster scan order.

9. An image encoding method performed by an image encoding apparatus, the image encoding method comprising:

determining whether information on subpictures is present; and based on the information on the subpictures being present, determining a scan order of the subpictures, wherein a first flag indicating whether the information on the subpictures is present is encoded in a bitstream, wherein the first flag specifies whether or not the subpictures are present, wherein the bitstream further includes information for specifying a number of subpictures, information for specifying whether or not all subpictures have a same width and a same height, and information for specifying a number of bits used to represent a subpicture identifier; and wherein the scan order of the subpictures is determined based on a second flag indicating whether the scan order of the subpictures is a raster scan order, and wherein based on the second flag being acquired from a supplemental enhancement information (SEI) message, the second flag is present before a first video coding layer (VCL) network abstraction layer (NAL) unit in a coded video sequence (CVS).

10. A non-transitory computer readable recording medium storing the bitstream generated by the image encoding method of claim 9.

11. A method for transmitting a bitstream generated by an image encoding method, the image encoding method comprising:

determining whether information on subpictures is present; and based on the information on the subpictures being present, determining a scan order of the subpictures, wherein a first flag indicating whether the information on the subpictures is present is encoded in a bitstream, wherein the first flag specifies whether or not the subpictures are present, wherein the bitstream further includes information for specifying a number of subpictures, information for specifying whether or not all subpictures have a same width and a same height, and information for specifying a number of bits used to represent a subpicture identifier; and wherein the scan order of the subpictures is determined based on a second flag indicating whether the scan order of the subpictures is a raster scan order, and wherein based on the second flag being acquired from a supplemental enhancement information (SEI) message, the second flag is present before a first video coding layer (VCL) network abstraction layer (NAL) unit in a coded video sequence (CVS).

* * * * *